D. M. Weston.
Draining Sugar &c.
No 2845 Reissued Jan. 14, 1868.
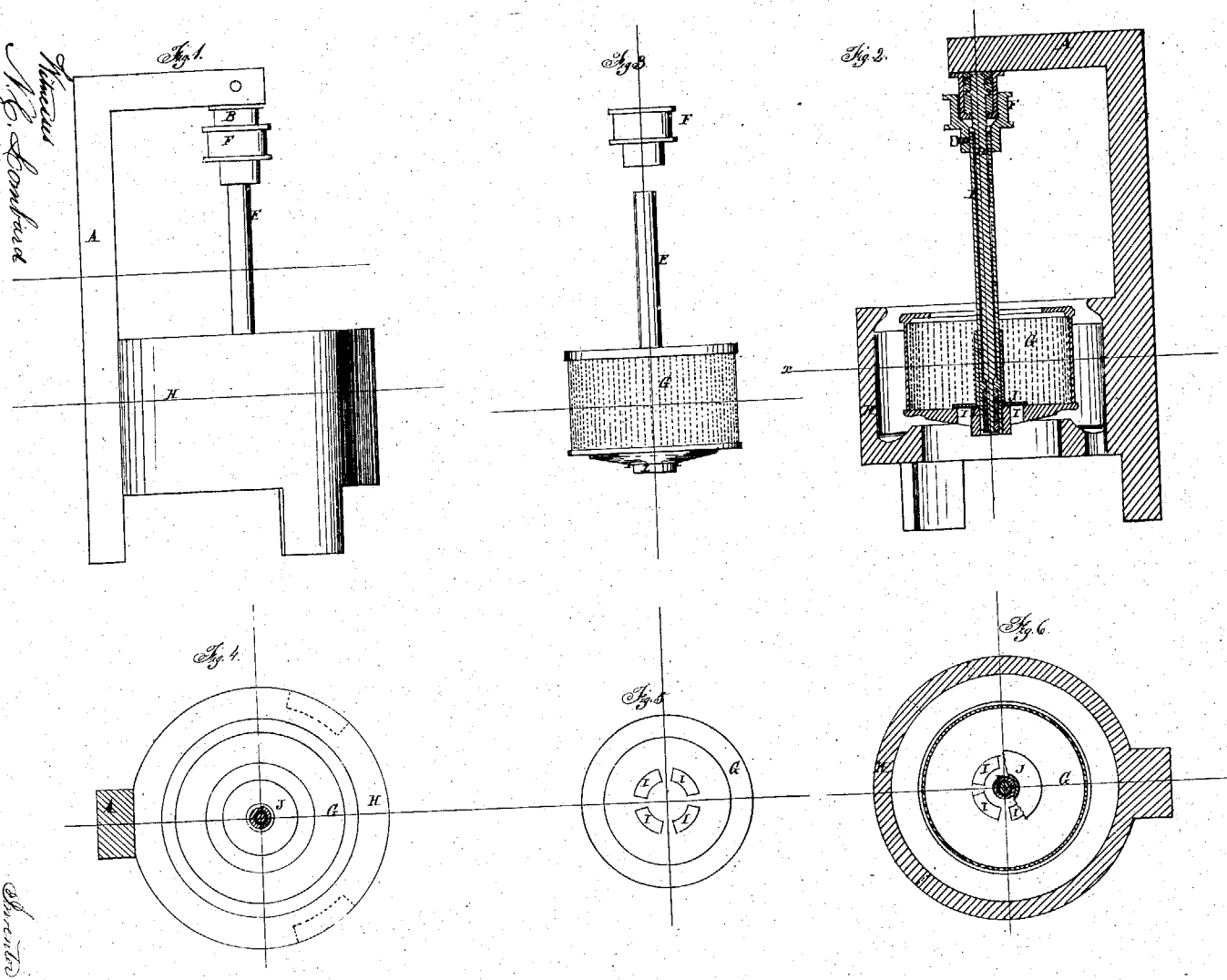
Witnesses
N. C. Lombard
Chas. A. Jordan
Inventor
David M. Weston

UNITED STATES PATENT OFFICE.

DAVID M. WESTON, OF BOSTON, MASSACHUSETTS.

IMPROVEMENT IN CENTRIFUGAL MACHINES FOR DRAINING SUGAR AND OTHER SUBSTANCES.

Specification forming part of Letters Patent No. 63,770, dated April 9, 1867; Reissue No. 2,845, dated January 14, 1868.

*To all whom it may concern:*

Be it known that I, DAVID M. WESTON, of Boston, in the county of Suffolk and State of Massachusetts, have invented a new and useful Improvement in Centrifugal Machines for Separating Fluid from Solid Matters; and I do hereby declare that the following is a full, clear, and exact description of the construction and operation of the same, reference being had to the accompanying drawings, making part of this specification, in which—

Figure 1 is an elevation of my improved centrifugal machine. Fig. 2 is a vertical section of the same. Fig. 3 is an elevation of the cylinder or basket and its shaft, with the driving-pulley shown detached therefrom. Fig. 4 is a plan of the top of the cylinder and the casing which surrounds it. Fig. 5 is a plan of the under side of the cylinder, showing the outlets at the bottom; and Fig. 6 is a horizontal section of the cylinder and casing on the line *x x* of Fig. 2, part of the valve being removed, so as to partially exhibit the outlets in the bottom.

The subject-matter of my invention, in the first place, consists in the method and means of avoiding or overcoming the injurious effects which were caused by the irregular or unequal distribution of the material to be operated upon within the cylinders or baskets of centrifugal machines while rotating with great velocity; and this result is attained by so suspending the cylinder or basket that the revolving mass will most readily and certainly approximate an axis of revolution *in equilibrio*, and will therefore communicate the least practicable amount of injurious motion or vibration to the fixed parts of the mechanism and to the structure on which it is suspended.

My plan for suspending the cylinder or basket consists in the use of a flexible elastic bearing or connection, on which the rotating parts of the machine and the contents are carried, which bearing is so applied as to allow the cylinder to revolve eccentrically, so far as is necessary to permit it to find an axis of revolution *in equilibrio*, even when the weight of the material to be acted upon is not equably distributed in the cylinder, while at the same time the elasticity of the bearing itself, or of other equivalent spring-connection, is so applied that in aid of and in addition to the force of gravity it will exert a restraining force, which increases as the eccentricity of movement of the cylinder increases, and tends to control or prevent any unnecessary and injurious gyration of the revolving parts.

My invention relates, in the second place, to the construction of the bearing by which the cylinder and its attachments are suspended, so as to permit and insure the action of the centrifugal machine before mentioned. In order that the essential character of the bearing may be better understood, I will briefly state the conditions under which it is required to operate. When the machine is in motion the cylinder and its attachments revolve with high velocity, and when they revolve eccentrically, by reason of an unbalanced load, the rapidity with which the bearing must vibrate will equal the rapidity of its revolution. To meet this condition of things it is necessary, first, that the bearing shall have sufficient freedom of motion to allow the revolving mass to find and revolve around its center of gravity; second, that in order to permit such rapid vibrations the spindle or bearing should have as little weight as is consistent with proper strength, and that part by which it is connected with the fixed support should move through the least practicable space, so that the momentum of the vibrating parts should be reduced to a minimum; third, that while the shaft is free to vibrate when in a vertical position it shall meet with a rapidly-increasing resistance when it leaves that position, so as to prevent the cylinder from being thrown into gyrations about the point of suspension, and so as to compel it to revolve, as nearly as may be, about its center, of gravity; and fourth, that the bearing should be connected with its fixed support by means of some flexible or elastic medium, which, by virtue of its elasticity, will permit the necessary movement of the bearing without making and breaking its contact with its support; otherwise the rapid succession of such contacts or impacts of their surfaces would produce a very objectionable noise and jar, and would soon derange the machine.

This part of my invention consists in the employment of a spindle for the bearing of the revolving cylinder, which works within the hollow shaft of the same, the lower end of which is provided with anti-friction collars or other suitable means to support the weight of the revolving parts, and the upper end of which is held by a bushing or cushion of india-rubber or other elastic material, which is itself held in a socket fixed to the frame which supports the machine, the elasticity of such connection serving to permit the necessary freedom of vibration of the shaft, and also the necessary restraint, to prevent a too great departure of the same from a vertical position.

My invention relates, in the third place, to the construction of the cylinder, by means of which the contents of the same may be more readily discharged than by the method usually employed; and consists in forming openings in the bottom of the cylinder around the shaft, which are closed by a valve or cover, as will be more particularly described.

Other peculiarities of construction will be mentioned in the description.

A is a frame, from which the machine is suspended. B is a socket, attached firmly to the frame A, containing the india-rubber bushing or spring C, in which the upright spindle D is held, and by the elasticity of which a limited vibration of the spindle in all directions is permitted.

The spindle is held firmly in the rubber bushing, and is supported by a flange on its upper end, as shown. Upon this spindle the rotary parts of the machine are hung and revolve.

E is an upright hollow shaft, encircling the spindle D, having a driving-pulley, F, attached to its upper end, and the cylinder or basket G, in which the materials to be acted upon by centrifugal force are placed, attached to its lower end, as shown. The shaft, by being made hollow, affords great stiffness, with little weight, and also affords a very compact and convenient arrangement for the bearing.

The cylinder and its connections are supported on the spindle by means of a shoulder upon the interior of the shaft, resting upon the series of anti-friction collars K, which are supported by a screw-nut, L, fitted to the lower end of the spindle.

The cylinder may be constructed in any of the common forms, with the usual opening at the top, and with perforated sides.

In the bottom of the cylinder I construct the openings I I I I around the shaft, which may be varied in form, and which are closed by the movable valve or cover J, which surrounds the shaft E, and slides loosely up and down upon it, as is shown in Fig. 2. That part of the valve that embraces the shaft is formed with a sleeve, which extends upward around the shaft a sufficient height to prevent any liquid matters that may be put into the cylinder from escaping between the valve and the shaft, and also forms a suitable guide to the movement of the valve.

The pulley F is so formed as to project above the shaft E and surround the fixed socket B, by which means the vibratory movement of the shaft produces but little disturbance of the belt; and for greater security the pulley is provided with flanges, which prevent the belt from wearing off.

H is a casing, within which the cylinder revolves, forming a receptacle for the liquids which are separated by centrifugal force from the materials acted upon.

The operation of the machine is as follows: The cylinder or basket G is filled through the opening in the top, with the valve J resting upon and covering the openings I in the bottom. Power is applied to the pulley F, affixed to the upright shaft E, and the cylinder, with its contents, revolves rapidly and freely upon the spindle suspended in the rubber bushing C, which enables the revolving mass, however unevenly its weight may be distributed, to find its own center of gravity and an axis, about which it revolves without jar or concussion. After the materials contained in the revolving cylinder have been acted upon and the liquids separated and discharged through the apertures in the sides by the centrifugal force thus created, the valve J is raised, sliding upward freely on the shaft out of the way, and the contents of the cylinder are discharged through the openings I in the bottom.

It is not essential to my invention that the flexible bearings by which the rotary parts of the machine are allowed to revolve with an eccentric movement should be made in the form I have above described. Other forms of bearings or joints or flexible connections may be made to effect this purpose, such as what is commonly called the "universal joint," or by connecting the upright shaft with its support by means of a ball-joint or a thin disk-plate, or other flexible connections, so arranged as to give the necessary freedom of movement to the shaft when it is nearly vertical, and also the restraining force necessary to prevent the revolving parts from gyrating from that position, as has been before explained.

What I claim as my invention, and desire to secure by Letters Patent, is as follows:

1. In the construction of centrifugal machines for separating liquids from other substances, suspending such machines at the top by flexible connections, operating substantially as described.

2. The combination of the spindle D and its accessories with the socket B and its india-rubber bushing C, or other equivalent spring-connection, to form a flexible and elastic bearing for the shaft E, by which the cylinder may be suspended, substantially as described.

3. The employment, in a centrifugal machine, of a hollow shaft, and a spindle or axle on which it runs, to support the cylinder or basket, substantially as described.

4. So forming and arranging the driving-pulley F upon the shaft E that it shall surround the spring-bearing, substantially in the manner and for the purpose described.

5. The construction of the openings I in the bottom of the cylinder in such machines, and the valve J, for the purpose of closing the same, substantially as described.

6. The combination of the cylinder G, the hollow shaft E, the driving-pulley F, the spindle D, its elastic bushing C, and socket B, to form the operative part of a centrifugal machine, substantially as described.

Executed at Boston, October, 1867.

DAVID M. WESTON.

Witnesses:
CHAS. A. JORDAN,
N. C. LOMBARD.